United States Patent
Jahangir et al.

(10) Patent No.: US 10,412,537 B2
(45) Date of Patent: Sep. 10, 2019

(54) SIP OPTIONS BASED LOCATION DETERMINATION

(71) Applicant: T-Mobile USA, Inc., Bellevue, WA (US)

(72) Inventors: Zeeshan Jahangir, Bellevue, WA (US); Muhammad Ejaz Sial, Snoqualmie, WA (US); Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 112 days.

(21) Appl. No.: 15/693,228

(22) Filed: Aug. 31, 2017

(65) Prior Publication Data

US 2019/0069126 A1  Feb. 28, 2019

(51) Int. Cl.
*H04W 4/02* (2018.01)
*H04W 80/10* (2009.01)

(52) U.S. Cl.
CPC .............. *H04W 4/02* (2013.01); *H04W 80/10* (2013.01)

(58) Field of Classification Search
CPC ............. H04L 65/1006; H04L 65/1016; H04L 65/1073; H04L 65/1069; H04L 67/18; H04L 61/6054; H04L 63/0853; H04L 65/104; H04L 67/14; H04L 29/06027; H04L 67/04; H04L 51/38; H04L 61/1588; H04L 61/2076; H04L 67/24; H04L 65/1009; H04L 65/102; H04L 67/30; H04L 29/12094; H04L 65/1046; H04L 65/105; H04L 65/605; H04L 65/1063;

(Continued)

(56) References Cited

U.S. PATENT DOCUMENTS

2003/0120813 A1\* 6/2003 Majumdar .............. H04L 29/06
709/247
2004/0072593 A1\* 4/2004 Robbins ............ H04M 3/42314
455/560

(Continued)

OTHER PUBLICATIONS

3GPP(TM), 3rd Generation Partnership Project; Technical Specification Group Core Network and Terminals; Location Services (LCS); Diameter-based SLh interface for Control Plane LCS (Release 13), Copyright 2017, 19 pages.

(Continued)

*Primary Examiner* — Nimesh Patel
(74) *Attorney, Agent, or Firm* — Lee & Hayes, P.C.

(57) ABSTRACT

Systems and methods provided herein are directed to a mechanism for determining current or currently known location of a user equipment (UE). Upon receiving a request regarding location information of the UE, a gateway mobile location center (GMLC) may send a SIP OPTIONS to an interrogating call session control function (I-CSCF). In response to receiving the SIP OPTIONS, the I-CSCF may perform a location information request (LIR) and a location information answer (LIA) with the HSS to locate a serving call session control function (S-CSCF) where the UE is registered. The S-CSCF may route the SIP OPTIONS to an application server (AS) to request the registered location information of the UE, and in response, the AS may send a 200 OK, as an acknowledgment, to the S-CSCF, that includes location information of the UE provided during registration of the UE.

14 Claims, 4 Drawing Sheets

(58) Field of Classification Search
CPC ......... H04L 67/20; H04L 67/42; H04L 65/40; H04L 65/4061; H04L 69/32; H04W 4/02; H04W 4/90; H04W 64/00; H04W 76/50; H04W 4/025; H04W 60/00; H04W 12/08; H04W 8/00; H04W 76/10; H04W 4/60; H04W 84/005; H04W 16/32; H04W 8/12; H04W 8/06; H04W 88/16; H04W 8/04; H04W 60/06; H04W 8/10; H04W 64/003; H04W 88/08; H04W 88/182; H04W 4/029; H04W 92/02; H04M 2242/30; H04M 7/006; H04M 2207/18; H04M 3/42348; H04M 3/42365; H04M 2207/20; H04M 7/125; H04M 15/8038; H04M 2215/2026; H04M 2215/34; H04M 2215/7442; H04M 15/90; H04M 2215/204; H04M 2207/12; H04M 3/5116; H04M 2242/04; H04M 7/123; H04M 7/1255; H04M 7/127; G01S 1/042; G01S 5/0221; G01S 5/06; G01S 19/42; G01S 5/0205

See application file for complete search history.

(56) References Cited

U.S. PATENT DOCUMENTS

| | | | | |
|---|---|---|---|---|
| 2005/0114513 | A1* | 5/2005 | Dorenbosch | H04L 29/12094 709/227 |
| 2006/0077932 | A1* | 4/2006 | Takeda | H04W 92/02 370/331 |
| 2006/0114885 | A1* | 6/2006 | Baek | H04W 92/02 370/352 |
| 2006/0242307 | A1* | 10/2006 | Jung | H04W 4/02 709/227 |
| 2006/0271693 | A1* | 11/2006 | Thiebaut | H04W 8/12 709/229 |
| 2007/0032243 | A1 | 2/2007 | Muller | |
| 2010/0041418 | A1 | 2/2010 | Edge et al. | |
| 2010/0165966 | A1* | 7/2010 | Petion | H04L 67/18 370/338 |
| 2011/0256885 | A1* | 10/2011 | Kojo | G01S 5/0027 455/456.1 |
| 2013/0171974 | A1* | 7/2013 | Bae | H04W 8/12 455/411 |
| 2013/0231078 | A1 | 9/2013 | Bharatia et al. | |
| 2014/0086108 | A1 | 3/2014 | Dunn et al. | |
| 2014/0086147 | A1* | 3/2014 | Narkar | H04W 8/00 370/328 |

OTHER PUBLICATIONS

3GPP(TM), "3GPP TS 23.271; Functional Stage 2 Description of Location Services (LCS) (Release 14)", Jun. 12, 2017, 184 pages.
The PCT Search Report and Written Opinion dated Nov. 27, 2018 for PCT Application No. PCT/US2018/045631, 10 pages.

* cited by examiner

SIP OPTIONS BASED LOCATION DETERMINATION

BACKGROUND

Modern telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. The 5G telecommunication technologies are the next generation mobile networks that are designed to combine both an evolution and revolution of the existing LTE/LTE-A mobile networks to provide a much higher connectivity, greater throughput, much lower latency, and ultra-high reliability to support new use cases and applications. Some of mobile devices operating in such telecommunication systems are also capable of operating over Wi-Fi networks for voice, also known as Voice-over-IP (VoIP) and data.

A mobile device does not necessarily stay in one location for any length of time, and may move within a coverage area or from one coverage area to the next. For certain services, such as location based services and emergency services, ascertaining the current location of the mobile device, and its user, is important and may be time critical. However, due to the mobile nature of the mobile device, the user's location associated with mobile device may not be current in a mobile network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to a mechanism for determining current or currently known location of a user equipment (UE). The UE may be a mobile device, such as a cellular phone, a smart phone, a laptop computer, or a tablet computer, an internet-of-things (IoT) device, a machine-to-machine communication capable device, and the like.

Upon receiving a request at a gateway mobile location center (GMLC) regarding location information of the UE, the GMLC may send a SIP OPTIONS including subscriber information in a request uniform resource identifier (RURI) or TO header to an interrogating call session control function (I-CSCF). The request may be a location service request from a client for the UE, and the SIP OPTIONS may be sent to the I-CSCF in addition to, or instead of, sending a Routing-Info-Request (RIR) to a home subscriber server (HSS). In response to receiving the SIP OPTIONS, the I-CSCF may perform a location information request (LIR) and a location information answer (LIA) with the HSS to locate a serving call session control function (S-CSCF) where the UE is registered. The S-CSCF may route the SIP OPTIONS to an application server (AS) to request the registered location information of the UE, and in response, the AS may send a 200 OK, as an acknowledgment, to the S-CSCF, that includes location information of the UE provided during registration of the UE. The S-CSCF may then forward the 200 OK having the registered location information of the UE to the GMLC.

Alternatively, the SIP OPTIONS may be forwarded from the S-CSCF may be forwarded to a proxy call session control function (P-CSCF), and then forwarded to the UE where the UE obtains its current location, for example by utilizing its global positioning system (GPS) function, in response to receiving the SIP OPTIONS from the P-CSCF. The UE responds back to the P-CSCF by sending a 200 OK including its current location information. The P-CSCF forwards the 200 OK to the S-CSCF, which then forwards the 200 OK to the GMLC.

Figure 1:
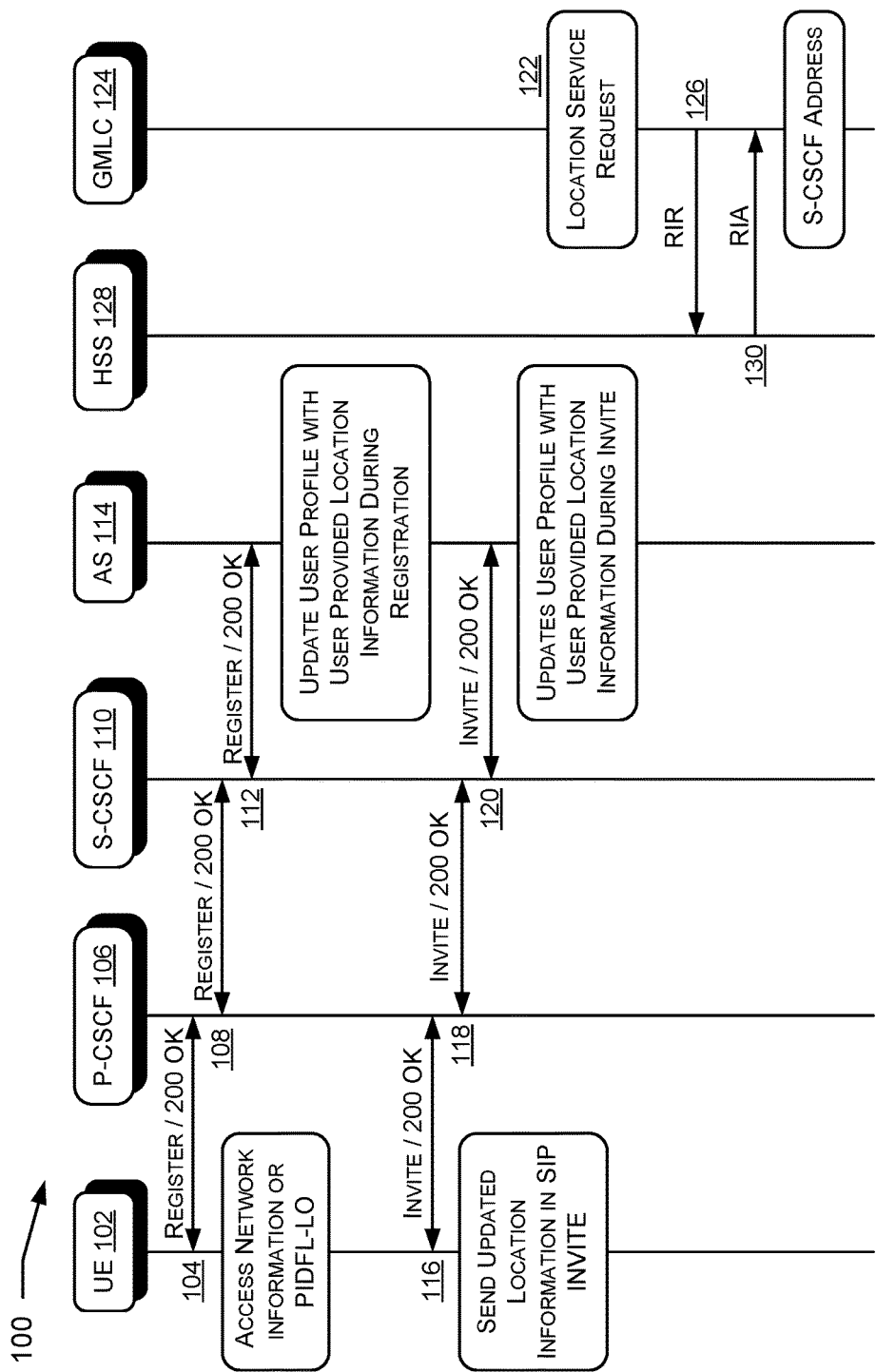
FIG. 1 illustrates an example flow diagram of determining location information of a user equipment (UE) based on the location information provided during the registration or SIP INVITE.

FIG. 1 illustrates an example flow diagram 100 of determining location information of a user equipment (UE) 102 based on the location information provided during the registration or SIP INVITE.

The UE 102 begins its registration process at 104 by registering with a proxy call session control function (P-CSCF) 106 and receiving a 200 OK from the P-CSCF 106. The UE 102 may send access network information or a presence information data format location Object (PIDFL-LO) to the P-CSCF 106. At 108, the P-CSCF 106 forwards the registration to a serving call session control function (S-CSCF) 110, and the S-CSCF 110 responds back with a 200 OK. At 112, the S-CSCF 110 forwards the registration to an application server (AS) 114, and the AS 114 responds back with a 200 OK. The AS 114 may update the user profile with user provided location information during the registration.

The UE 102 may send a SIP INVITE to the P-CSCF 106 at 116 and receive a 200 OK from the P-CSCF 106. The UE 102 may send updated location information to the P-CSCF 106 in the SIP INVITE. At 118, the P-CSCF 106 forwards the SIP INVTE to the S-CSCF 110, and the S-CSCF 110 responds back with a 200 OK. At 120, the S-CSCF 110 forwards the SIP INVITE to the AS 114, and the AS 114 responds back with a 200 OK. The AS 114 may update the user profile with user provided location information during the registration.

At 122, a client may request location service request for the UE 102, which is received by a gateway mobile location center (GMLC) 124. The GMLC 124, at 126, sends a Routing-Info-Request (RIR) including inquiries regarding the name of the S-CSCF 110, user name of the UE 102, mobile station international subscriber directory number (MSISDN) to a home subscriber server (HSS) 128. In response, the HSS 128 sends back a Routing-Info-Answer (RIA) at 130, which may include the address of the S-CSCF, if the UE 102 is Internet Protocol (IP) Multimedia Subsystem (IMS) registered, the UE location information of the registration, or the SIP INVITE, may be kept.

Figure 2:
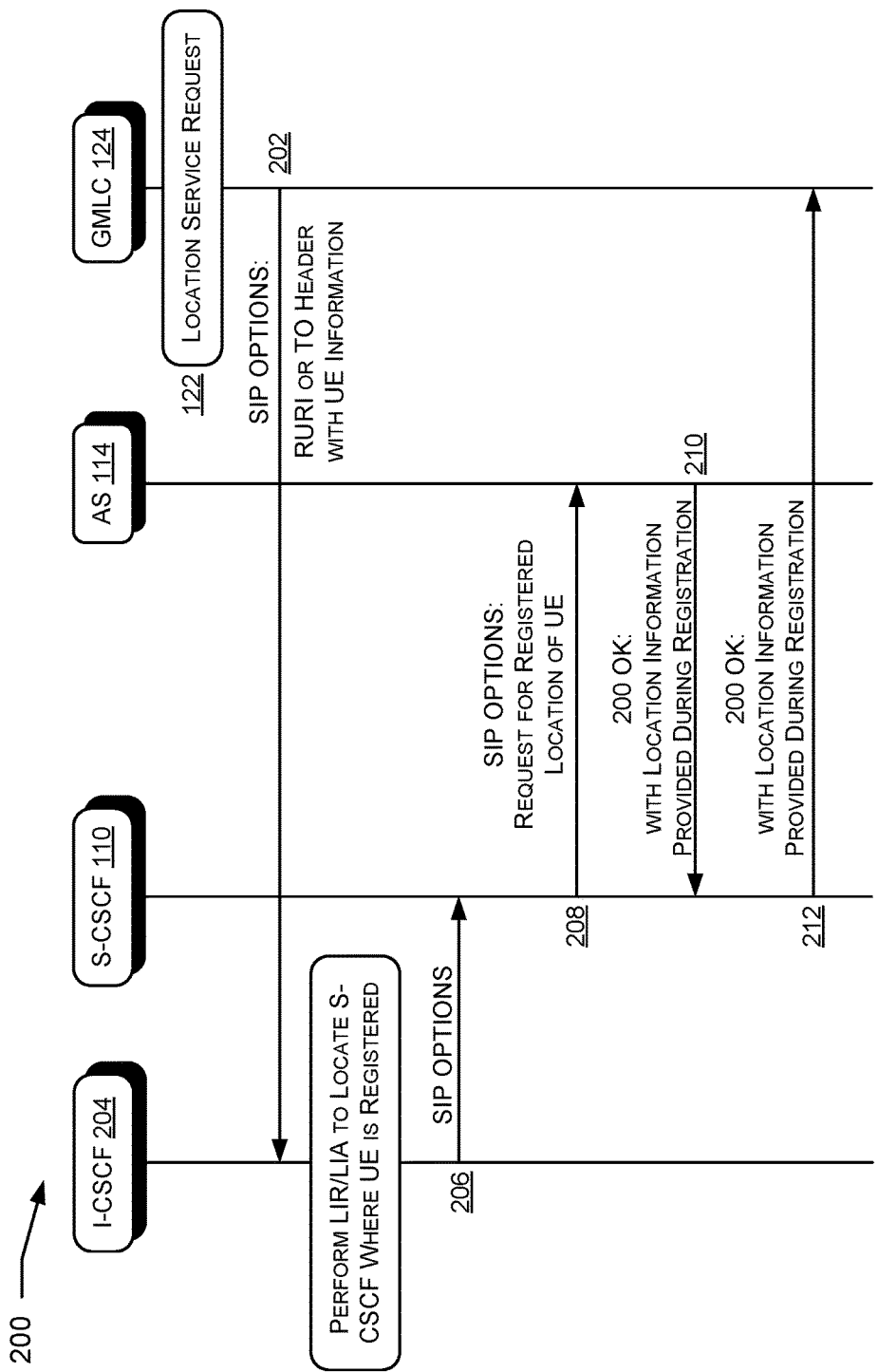
FIG. 2 illustrates an example flow diagram of determining location information of the UE utilizing SIP OPTIONS.

FIG. 2 illustrates an example flow diagram 200 of determining location information of the UE 102 utilizing SIP OPTIONS.

Continuing from FIG. 1, after receiving the location service request for the UE 102 from the client at 122, the GMLC 124 may, at 202, send SIP OPTIONS to an interrogating call session control function (I-CSCF) 204 with the UE information in a request uniform resource identifier (RURI) header or in a TO header of the SIP OPTIONS. The GMLC 124 may send the SIP OPTIONS at 202 in addition to, or instead of, sending the RIR to the HSS 128 at 126.

In response to receiving the SIP OPTIONS, the I-CSCF 204 may perform a location information request (LIR) and a location information answer (LIA) with the HSS 128 to locate the S-CSCF 110 where the UE 102 is registered, and may route the SIP OPTIONS to S-CSCF 110 at 206. In response, at 208, the S-CSCF 110 may forward the SIP OPTIONS to the AS 114 to request for the registered location of the UE 102, and the AS 114 may correspond back to the S-CSCF 110 at 210, with a 200 OK including the location information of the UE 102 provided during the registration of the UE 102. The S-CSCF 110, at 212, may then route the 200 OK with the location information of the UE 102 provided during the registration of the UE 102 to the GMLC 124.

Figure 3:
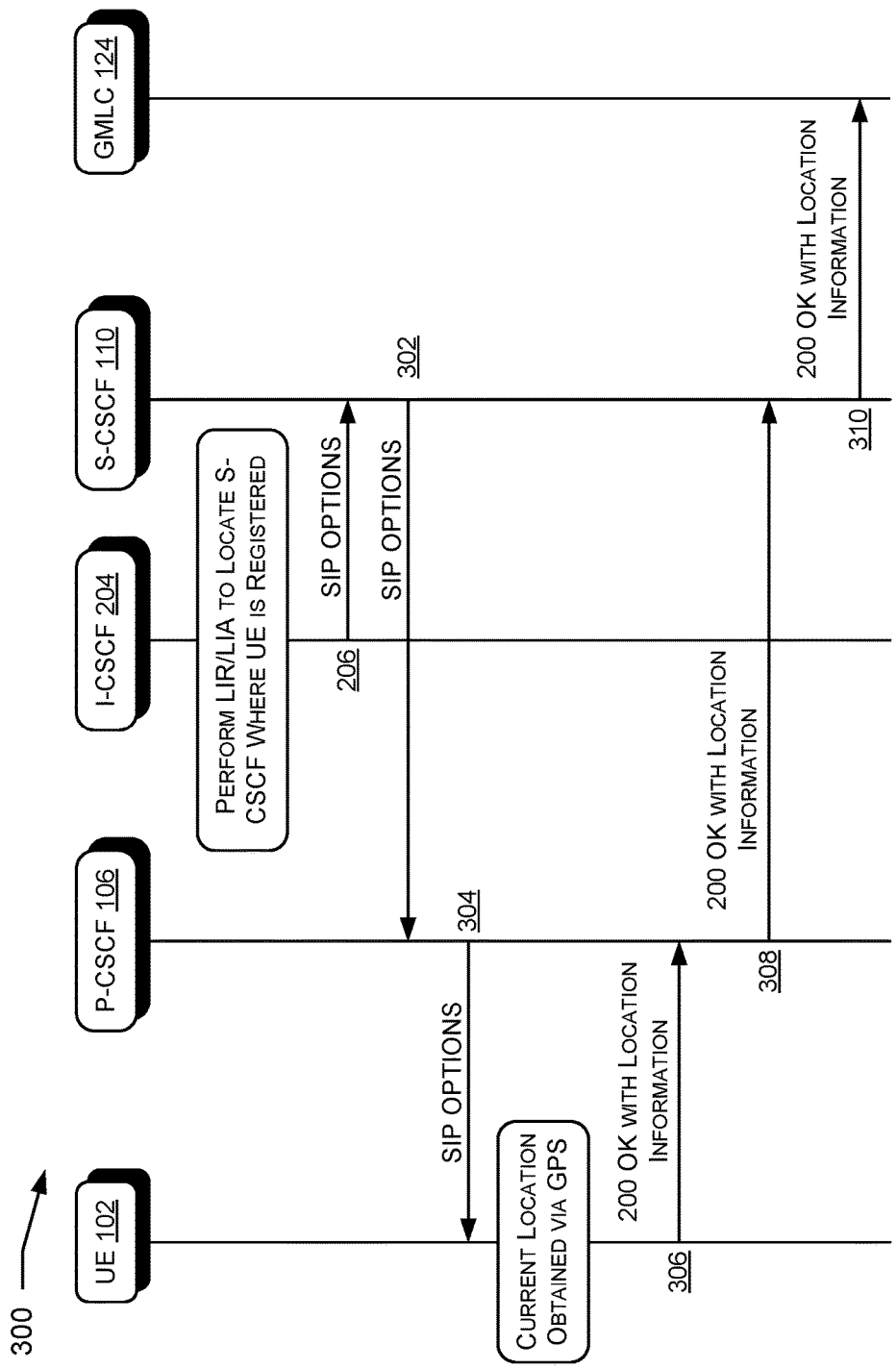
FIG. 3 illustrates another example flow diagram of determining location information of the UE utilizing SIP OPTIONS.

FIG. 3 illustrates another example flow diagram 300 of determining location information of the UE 102 utilizing SIP OPTIONS.

Continuing from FIG. 2, after the I-CSCF 204 performs the LIR and LIA, and routes the SIP OPTIONS to S-CSCF 110 at 206, the S-CSCF 110 may forward the SIP OPTIONS, at 302, to the P-CSCF 106. The P-CSCF 106 may forward the SIP OPTIONS at 304 to the UE 102, and in response, the UE 102 may obtain its current location information, for example, via a global positioning system (GPS). The UE 102 may then transmit a 200 OK that includes the current location information of the UE 102 to the P-CSCF 106 at 308. The P-CSCF 106 may then forward the 200 OK to the S-CSCF 110 at 308, and the S-CSCF 110 may forward the 200 OK to the GMLC 124 at 310.

Figure 4:
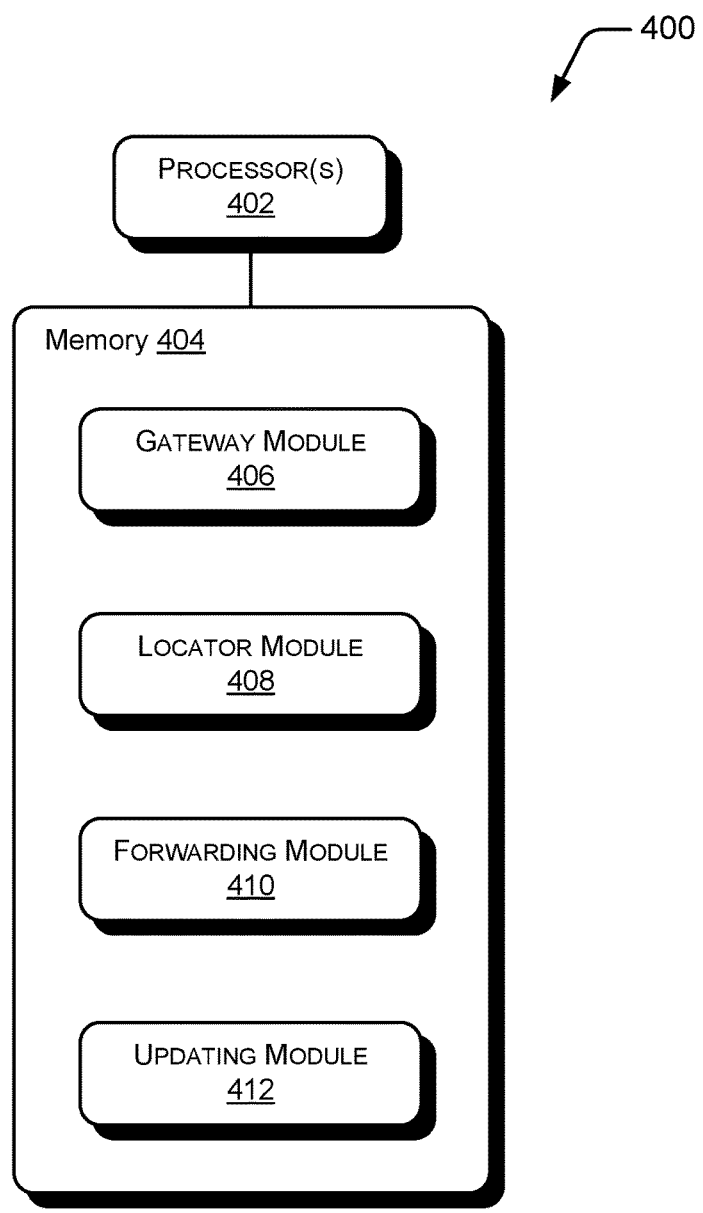
FIG. 4 illustrates an example block diagram of a system for determining location information of the UE utilizing SIP OPTIONS.

FIG. 4 illustrates an example block diagram of a system 400 for determining location information of the UE 102 utilizing SIP OPTIONS.

The system 400 may comprise one or more processors 402 and memory 404 communicatively coupled to the one or more processors 402. The memory 404 may comprise a plurality of modules that are communicatively coupled to each other. The plurality of modules may comprise a gateway module 406, a locator module 408, a forwarding module 410, and an updating module 412. The gateway module 406 may be configured to receive a location inquiry associated with the UE 102 at the GMLC 124 as described above with reference to FIG. 1, and in response to receiving the location inquiry, may send a SIP OPTIONS to the I-CSCF 204. The SIP OPTIONS may include UE information in the RURI header or in a TO header, and may be sent in addition to, or instead of, sending the RIR to the HSS 128.

The locator module 408 may be configured to locate the S-CSCF 110, where the UE 102 is registered, by performing the LIR and the LIA with the HSS 128 at the I-CSCF 204. The forwarding module 410 may be configured to forward the SIP OPTIONS from the I-CSCF 204 to the S-CSCF 110 found as a result of performing the LIR and LIR. The updating module 412 may be configured to update the S-CSCF 110 with current location information of the UE 102 and to transmit the current location information of the UE 102 from the S-CSCF 110 to the GMLC 124.

As discussed with reference to FIG. 2, the updating module 412 may be further configured to send the SIP OPTIONS from the S-CSCF 110 to the AS 114 to request for registered location information of the UE 102, send a 200 OK including location information of the UE provided during registration of the UE 102 from the AS 114 to the S-CSCF 110, and forward the 200 OK including the registered location information of the UE 102 from the S-CSCF 110 to the GMLC 124. Alternatively, as discussed with referenced to FIG. 3, the updating module 412 may be further configured to forward the SIP OPTIONS from the S-CSCF 110 to the P-CSCF 106, forward the SIP OPTIONS from the P-CSCF 106 to the UE 102. The UE 102, in response to receiving the SIP OPTIONS, may obtain its current location information based on, for example, its internal GPS. The updating module 412 may be configured to transmit a 200 OK including the obtained current location of the UE 102 from the UE 102 to the P-CSCF 106, forward the 200 OK from the P-CSCF 106 to the S-CSCF 110, and forward the 200 OK having the current location of the UE 102 from the S-CSCF 110 to the GMLC 124.

Some or all operations of the methods described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-4. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for acquiring location information of a user equipment (UE), the method comprising:
  receiving a location inquiry associated with the UE, wherein receiving the location inquiry associated with the UE comprises receiving the location inquiry at a gateway mobile location center (GMLC);
  in response to receiving the location inquiry, sending a request to a first session controller, the request including UE information, wherein sending the request to the first session controller comprises one of:
    sending the request to the first session controller in addition to sending a Routing-Info-Request (RIR) to a home subscriber server (HSS), or
    sending the request to the first session controller instead of sending the RIR to the HSS,
    wherein the request is a Session Initiation Protocol (SIP) OPTIONS having the UE information included in a request uniform resource identifier (RURI) header or in a TO header of the SIP OPTIONS, and the first session controller is an interrogating call session control function (I-CSCF);
  locating a second session controller, the second session controller having registered location information of the UE, wherein locating the second session controller comprises:
    performing, by the I-CSCF, a location information request (LIR) and a location information answer (LIA) with the HSS to locate a serving call session control function (S-CSCF) where the UE is registered, and
    locating the S-CSCF;
  forwarding the request from the first session controller to the second session controller;
  updating the second session controller with current location information of the UE; and
  transmitting the current location information of the UE from the second session controller.

2. A method of claim 1, wherein updating the second session controller with the current location information of the UE comprises:
  sending the SIP OPTIONS from the S-CSCF to an application server (AS) requesting for the registered location information of the UE; and
  sending an acknowledgement from the AS to the S-CSCF, the acknowledgment including location information of the UE provided during registration of the UE,
  wherein the acknowledgment is a 200 OK.

3. A method of claim 2, wherein transmitting the current location information of the UE from the second session controller comprises:
  forwarding, from the S-CSCF to the GMLC, the 200 OK having the registered location information of the UE.

4. A method of claim 1, wherein updating the second session controller with the current location information of the UE comprises:
  forwarding the SIP OPTIONS from the S-CSCF to a proxy call session control function (P-CSCF);
  forwarding the SIP OPTIONS from the P-CSCF to the UE;
  transmitting, from the UE to the P-CSCF, an acknowledgement including current location information of the UE obtained from the UE; and
  forwarding the acknowledgement from the P-CSCF to the S-CSCF,
  wherein the acknowledgment is a 200 OK.

5. A method of claim 4, wherein the current location information of the UE comprises a current location of the UE obtained by the UE in response to receiving the SIP OPTIONS from the P-CSCF.

6. A method of claim 5, wherein transmitting the current location information of the UE from the second session controller comprises:
  forwarding, from the S-CSCF to the GMLC, the 200 OK having the current location of the UE.

7. A non-transitory computer storage medium storing computer-readable instructions executable by a computer, that when executed by the computer, cause the computer to perform operations comprising:
  receiving a location inquiry associated with a UE, wherein receiving the location inquiry associated with the UE comprises receiving the location inquiry at a gateway mobile location center (GMLC);
  in response to receiving the location inquiry, sending a request to a first session controller, the request including UE information, wherein sending the request to the first session controller comprises one of:
    sending the request to the first session controller in addition to sending a Routing-Info-Request (RIR) to a home subscriber server (HSS), or
    sending the request to the first session controller instead of sending the RIR to the HSS,
    wherein the request is a Session Initiation Protocol (SIP) OPTIONS having the UE information included in a request uniform resource identifier (RURI) header or in a TO header of the SIP OPTIONS, and the first session controller is an interrogating call session control function (I-CSCF);
  locating a second session controller, the second session controller having last registered location information of the UE, wherein locating the second session controller comprises:
    performing, by the I-CSCF, a location information request (LIR) and a location information answer (LIA) with the HSS to locate a serving call session control function (S-CSCF) where the UE is registered, and
    locating the S-CSCF;

forwarding the request from the first session controller to the second session controller;

updating the second session controller with current location information of the UE; and transmitting the current location information of the UE from the second session controller.

8. A non-transitory computer storage medium of claim 7, wherein updating the second session controller with the current location information of the UE comprises:

sending the SIP OPTIONS from the S-CSCF to an application server (AS) requesting for the registered location information of the UE; and sending an acknowledgement from the AS to the S-CSCF, the acknowledgment including location information of the UE provided during registration of the UE, wherein the acknowledgment is a 200 OK.

9. A non-transitory computer storage medium of claim 8, wherein transmitting the current location information of the UE from the second session controller comprises:

forwarding, from the S-CSCF to the GMLC, the 200 OK having the registered location information of the UE.

10. A non-transitory computer storage medium of claim 7, wherein updating the second session controller with the current location information of the UE comprises:

forwarding the SIP OPTIONS from the S-CSCF to a proxy call session control function (P-CSCF);

forwarding the SIP OPTIONS from the P-CSCF to the UE;

transmitting, from the UE to the P-CSCF, an acknowledgement including a current location of the UE obtained by the UE in response to receiving the SIP OPTIONS from the P-CSCF; and forwarding the acknowledgement from the P-CSCF to the S-CSCF, wherein the acknowledgment is a 200 OK.

11. A non-transitory computer storage medium of claim 9, wherein transmitting the current location information of the UE from the second session controller comprises:

forwarding, from the S-CSCF to the GMLC, the 200 OK having the current location of the UE.

12. A system for acquiring location information of a user equipment (UE), the system comprising:

one or more processors;

memory communicatively coupled to the one or more processors, the memory comprising a plurality of modules communicatively coupled to each other, the plurality of modules comprising:

a gateway module configured to:

receive a location inquiry associated with the UE at a gateway mobile location center (GMLC), and in response to receiving the location inquiry, send a Session Initiation Protocol (SIP) OPTIONS to an interrogating call session control function (I-CSCF), the SIP OPTIONS including UE information in a request uniform resource identifier (RURI) header or in a TO header in addition to, or instead of, sending a Routing-Info-Request (RIR) to a home subscriber server (HSS);

a locator module configured to locate a serving call session control function (S-CSCF) where the UE is registered by performing, by the I-CSCF, a location information request (LIR) and a location information answer (LIA) with the HSS;

a forwarding module configured to forward the SIP OPTIONS from the I-CSCF to the S-CSCF; and an updating module configured to update the S-CSCF with current location information of the UE, and to transmit the current location information of the UE from the S-CSCF to the GMLC.

13. A system of claim 12, wherein the updating module is further configured to:

send the SIP OPTIONS, from the S-CSCF to an application server (AS), requesting for registered location information of the UE;

send a 200 OK, from the AS to the S-CSCF, the 200 OK including location information of the UE provided during registration of the UE;

forward, from the S-CSCF to the GMLC, the 200 OK having the registered location information of the UE.

14. A system of claim 12, wherein the updating module is further configured to:

forward the SIP OPTIONS from the S-CSCF to a proxy call session control function (P-CSCF);

forward the SIP OPTIONS from the P-CSCF to the UE;

transmit, from the UE to the P-CSCF, a 200 OK including a current location of the UE obtained by the UE in response to receiving the SIP OPTIONS from the P-CSCF;

forward the 200 OK from the P-CSCF to the S-CSCF;

forward, from the S-CSCF to the GMLC, the 200 OK having the current location of the UE.

* * * * *